US009904787B2

(12) United States Patent
Tripp et al.

(10) Patent No.: US 9,904,787 B2
(45) Date of Patent: *Feb. 27, 2018

(54) IDENTIFYING STORED SECURITY VULNERABILITIES IN COMPUTER SOFTWARE APPLICATIONS

(71) Applicant: International Business Machines Corporation, Armonk, NY (US)

(72) Inventors: Omer Tripp, Bronx, NY (US); Omri Weisman, Tel-Aviv (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/067,032

(22) Filed: Oct. 30, 2013

(65) Prior Publication Data

US 2014/0201842 A1 Jul. 17, 2014

Related U.S. Application Data

(63) Continuation of application No. 13/743,474, filed on Jan. 17, 2013.

(51) Int. Cl.
*G06F 21/57* (2013.01)

(52) U.S. Cl.
CPC .................. *G06F 21/577* (2013.01)

(58) Field of Classification Search
CPC ........ G06F 21/577; G06F 21/00; G06F 21/56; G06F 21/566; G06F 21/57; H04L 63/1433; H04L 63/1416

(Continued)

(56) References Cited

U.S. PATENT DOCUMENTS 8,141,158 B2   3/2012 Calendino et al.
8,578,482 B1 * 11/2013 Yang et al. .................... 726/22
(Continued)

FOREIGN PATENT DOCUMENTS

WO   2006081459 A2   8/2006

OTHER PUBLICATIONS

IBM Application Security Insider: Research, IBM Application Security Insider, http://blog.watchfire.com/wfblog/; Sep. 22, 2008 "Winamp "NowPlaying" Unspecified Vulnerability: The Details" pp. 1-17.*

(Continued)

*Primary Examiner* — Harunur Rashid
(74) *Attorney, Agent, or Firm* — Cuenot, Forsythe & Kim, LLC

(57) ABSTRACT

Identifying stored security vulnerabilities in computer software applications by providing via a first interface of a computer software application during execution of the computer software application, test data having a characteristic of a malicious payload, where an interaction performed with the first interface resulted in data being written to a location within a persistent data store, and where an interaction performed with a second interface of the computer software application resulted in data being read from the location within the persistent data store, and identifying a stored security vulnerability associated with the computer software application if the test data are written to the persistent data store at the location.

8 Claims, 3 Drawing Sheets

(58) Field of Classification Search
USPC .................................................. 726/5, 25
See application file for complete search history.

(56) References Cited

U.S. PATENT DOCUMENTS

| 8,752,183 | B1* | 6/2014 | Heiderich et al. ............. 726/25 |
| 2009/0119777 | A1 | 5/2009 | Jeon |
| 2009/0205047 | A1 | 8/2009 | Podjarny |
| 2011/0231936 | A1* | 9/2011 | Williams et al. ............. 726/25 |
| 2011/0252475 | A1* | 10/2011 | Mui .................... G06F 21/56 726/23 |
| 2012/0255023 | A1* | 10/2012 | Maor et al. ................. 726/25 |
| 2013/0091578 | A1* | 4/2013 | Bisht .................... G06F 21/53 726/25 |

OTHER PUBLICATIONS

Claburn et al., Black Hat: Google Gears Offline Data Vulnerable, InformationWeek, Feb. 20, 2009, p. 1-2.*

Manadhata et al., An Attack Surface Metric, IEEE Transactions on Software Engineering, vol. 37, No. 3, May/Jun. 2011, pp. 1-16.*
Kuppan et al., Google Gears for Attackers, http://www.andlabs.org/; Mar. 2, 2010, pp. 1-21.*
Sekar et al., "An Efficient Black-box Technique for Defeating Web Application Attacks." , Feb. 2009; In NDSS. pp. 1-17.*
Huang, Y.W. et al., "A testing framework for web application security assessment", Elsevier, Computer Networks, vol. 48, pp. 739-761, Feb. 12, 2005.
Bau, J. et al., "State of the art: automated black-box web application vulnerability testing", Stanford University, 2010 IEEE Symposium on Security and Privacy (SP), pp. 332-345, May 16-19, 2010.
"System, method and apparatus for on-the-fly redundancy detection and elimination during dynamic testing using a glass-box methodology", [online] IP.com Prior Art Database, Technical Disclosure No. IPCOM000208354D, Jul. 4, 2011, retrieved from the Internet: <http://ip.com/IPCOM/000208354>, 4 pgs.
"Through the looking-glass", [online] IBM Application Security Insider, Info Bits, Research, Web Application Scanners, Nov. 16, 2011, retreived from the Internet: <http://blog.watchfire.com/wfblog/2011/11/through-the-looking-glass.html>, 4 pgs.

* cited by examiner

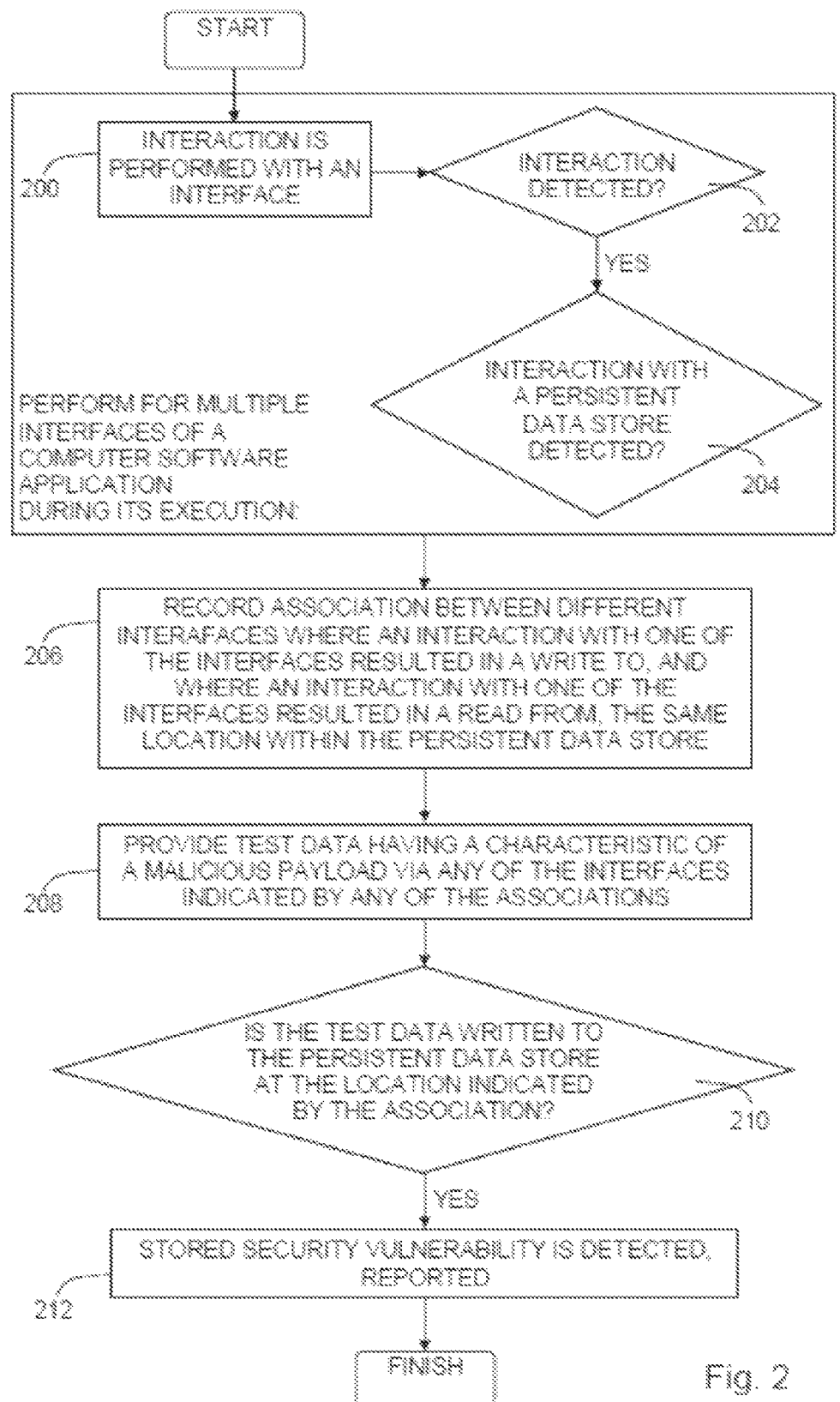

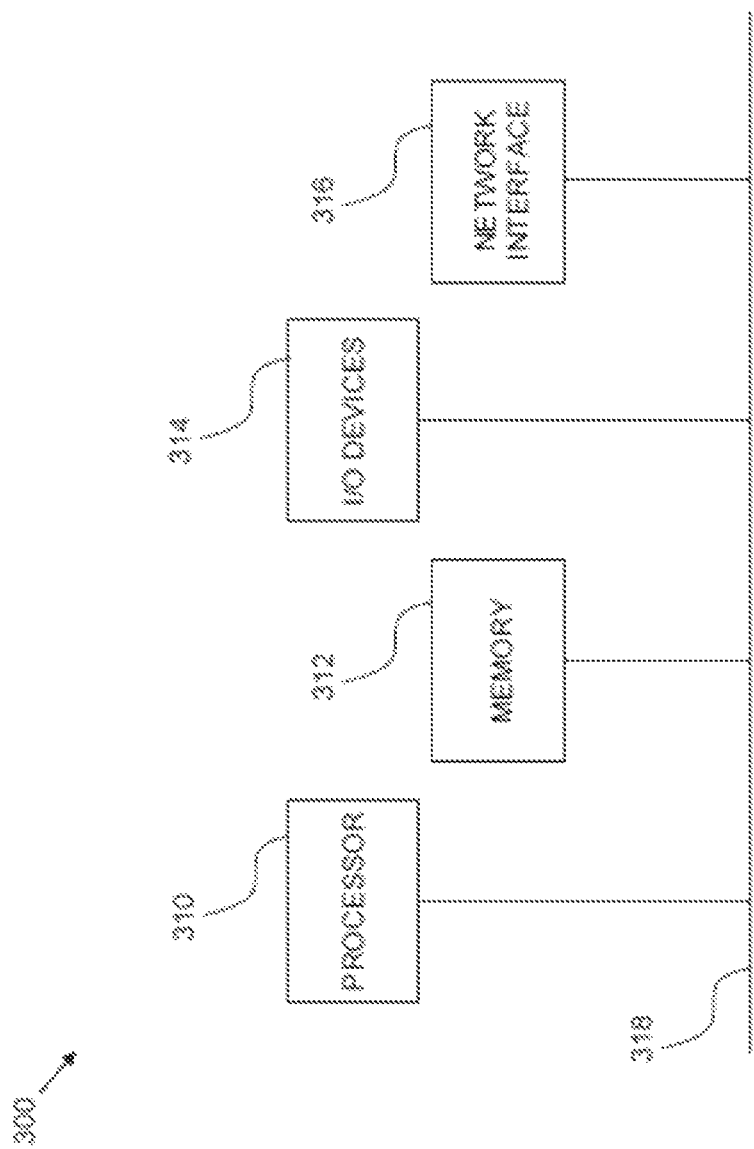

IDENTIFYING STORED SECURITY VULNERABILITIES IN COMPUTER SOFTWARE APPLICATIONS

CROSS-REFERENCE TO RELATED APPLICATIONS

This application is a Continuation of U.S. application Ser. No. 13/743,474, filed on Jan. 17, 2013, the entirety of which is incorporated herein by reference.

FIELD OF THE INVENTION

The invention relates to computer software analysis and testing in general.

BACKGROUND OF THE INVENTION

Computer software applications, and particularly web applications, are often the target of malicious attacks. In one type of malicious attack known as stored cross-site scripting ("stored XSS"), an attacker provides a malicious payload as input to a web application which then stores the malicious payload, where a subsequent interaction with the web application results in the malicious payload causing unwanted or unauthorized actions to be performed. For example, a malicious payload may be in the form of JavaScript™ instructions included in a message that is provided by an attacker's computer as input to a web-based message board application, where the application then stores the message for later retrieval. The stored XSS attack succeeds when a client computer subsequently interacts with the application and receives the stored JavaScript™ instructions from the application, whereupon the JavaScript™ instructions are executed at the client computer, causing unwanted or unauthorized actions to be performed at or by the client computer.

Computer software applications are often tested during their development to determine whether they are vulnerable to such malicious attacks or otherwise show signs of security vulnerabilities. One such type of testing, known as "black-box" testing, involves executing an application, interacting with the application's interfaces, such as by using known forms of malicious attacks, and then searching for evidence that an interaction exposed a known type of vulnerability. Unfortunately, black-box testing tools have had only limited success determining whether applications are vulnerable to stored attacks.

SUMMARY OF THE INVENTION

In one aspect of the invention a method is provided for identifying stored security vulnerabilities in computer software applications, the method including providing via a first interface of a computer software application during execution of the computer software application and using a processor, test data having a characteristic of a malicious payload, where an interaction performed with the first interface results in data written to a location within a persistent data store, and where an interaction performed with a second interface of the computer software application results in data read from the location within the persistent data store, and identifying a stored security vulnerability associated with the computer software application if the test data are written to the persistent data store at the location.

In another aspect of the invention a method is provided for identifying stored security vulnerabilities in computer software applications, the method including detecting, responsive to an interaction performed with a first interface of a computer software application during execution of the computer software application and using a processor, an interaction with a persistent data store at a location within the persistent data store, detecting, responsive to an interaction performed with a second interface of the computer software application during execution of the computer software application, an interaction with the persistent data store at the location within the persistent data store, recording an association between the first interface and the second interface, where during one of the interactions with the persistent data store data are written to the persistent data store at the location, and where during the other of the interactions with the persistent data store the data are read from the location within the persistent data store, providing to the computer software application during execution of the computer software application, via any of the interfaces indicated by the association, test data having a characteristic of a malicious payload, and identifying a stored security vulnerability associated with the computer software application if the test data are written to the persistent data store at the location.

Systems and computer program products embodying the invention are also provided.

BRIEF DESCRIPTION OF THE DRAWINGS

The invention will be understood and appreciated more fully from the following detailed description taken in conjunction with the appended drawings in which:

FIG. 2 is a simplified flowchart illustration of an exemplary method of operation of the system of FIG. 1, operative in accordance with an embodiment of the invention; and FIG. 3 is a simplified block diagram illustration of an exemplary hardware implementation of a computing system, constructed and operative in accordance with an embodiment of the invention.

DETAILED DESCRIPTION OF THE INVENTION

Figure 1:
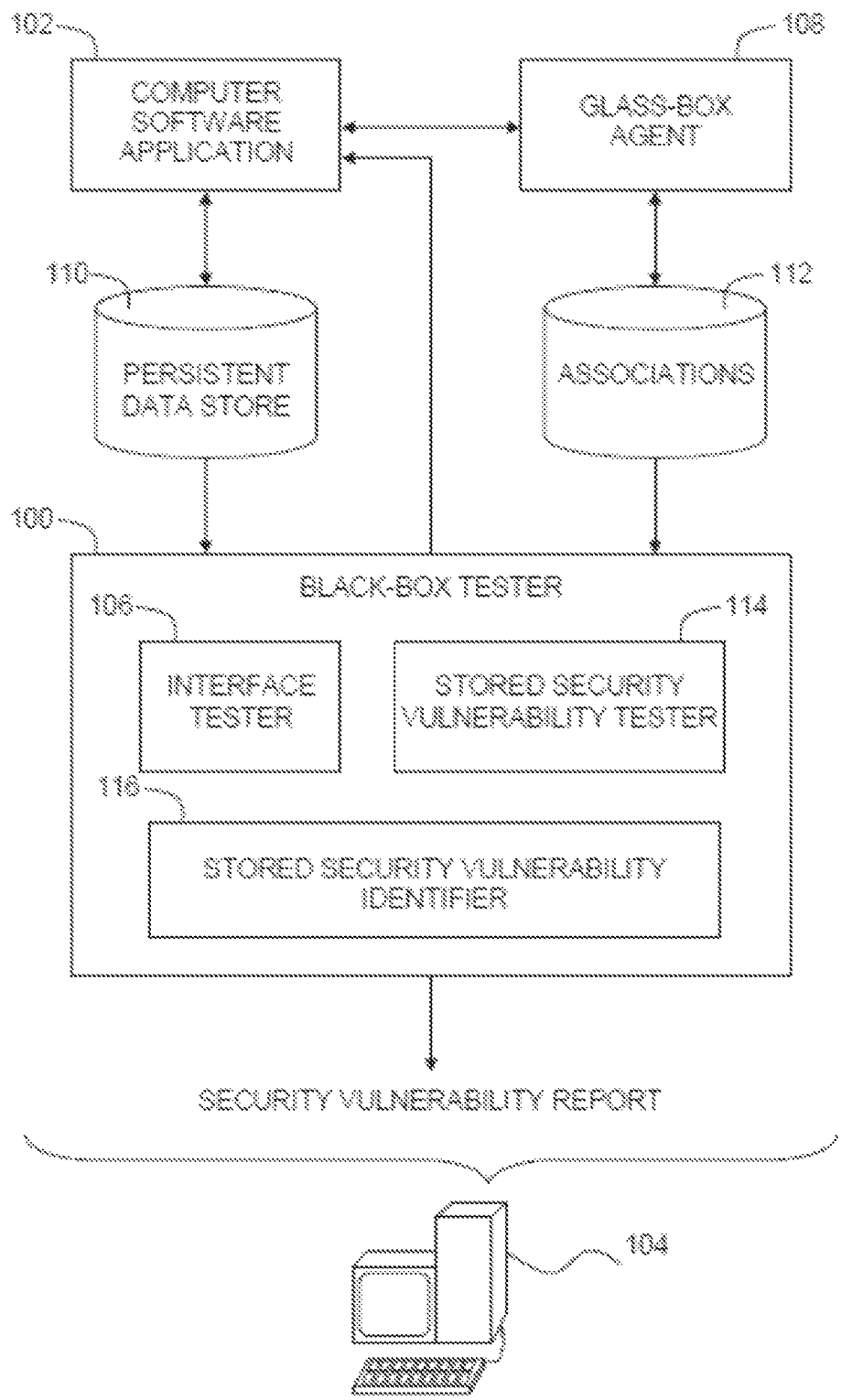
FIG. 1 is a simplified conceptual illustration of a system for identifying stored security vulnerabilities in computer software applications, constructed and operative in accordance with an embodiment of the invention.

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1 which is a simplified conceptual illustration of a system for identifying stored security vulnerabilities in computer software applications, constructed and operative in accordance with an embodiment of the invention. In the system of FIG. 1, a black-box tester 100, such as IBM Security AppScan™, commercially-available from International Business Machines Corporation, Armonk, N.Y., is configured to interact with a computer software application 102 during its execution by a computer, such as a computer 104. Computer software application 102 may be any type of computer software application that is suitable for testing using conventional black-box testing techniques, including computer software applications configured for use with mainframe and desktop computers and mobile computing devices, as well as web applications that may be hosted by a computer server and accessed by one or more client computers via a computer network, such as the Internet.

Black-box tester 100 preferably includes an interface tester 106 configured to interact with interfaces exposed by computer software application 102, such as by providing predefined test data as input to computer software application 102 via such interfaces that are configured to receive data input, as well as by receiving data output via such interfaces that are configured to provide data output. Computer software application 102 is preferably instrumented, such as by a glass-box agent 108, to detect such interactions, as well as to detect, in response to such interactions, when computer software application 102 interacts with a persistent data store 110, which may be any data storage medium, such as by writing data to persistent data store 110 or reading data from persistent data store 110, as well as note the locations of such read or write interactions within persistent data store 110. Computer software application 102 is preferably configured to report to glass-box agent 108 regarding the above detected interactions and locations.

When an interaction performed by interface tester 106 with one interface of computer software application 102 results in an interaction with a persistent data store 110 at a location within persistent data store 110, and an interaction performed by interface tester 106 with another interface of computer software application 102 results in an interaction with a persistent data store 110 at the same location within persistent data store 110, and particularly when during one of the interactions with persistent data store 110 data are written to persistent data store 110, and when during the other interaction with persistent data store 110 data are read from persistent data store 110, glass-box agent 108 preferably records an association between the two interfaces of computer software application 102, such as in an associations table 112, together with information identifying the associated read/write location within persistent data store 110. Additionally or alternatively, computer software application 102 itself records the association in associations table 112. Interface tester 106 preferably performs such interactions with any, and preferably all, of the interfaces exposed by computer software application 102 so as to discover as many of such associations between the interfaces as possible.

Black-box tester 100 also preferably includes a stored security vulnerability tester 114 configured to provide test data having a characteristic of a malicious payload to computer software application 102 during its execution, such as where the test data are in the form of JavaScript™ or Flash™ ActionScript™ code that is configured to be implemented by a computer that receives the test data as output from computer software application 102. Stored security vulnerability tester 114 preferably provides the test data via any of the interfaces indicated by any, and preferably all, of the associations in associations table 112. Black-box tester 100 also preferably includes a stored security vulnerability identifier 116 configured to identify a stored security vulnerability associated with computer software application 102 if the test data provided by stored security vulnerability tester 114 while testing any of the associations in associations table 112 are written to persistent data store 110 at the location indicated by the association. Stored security vulnerability identifier 116 is also preferably configured to report, using any conventional reporting means, the stored security vulnerability together with any of the information indicated by the association being tested.

Any of the elements shown in FIG. 1 are preferably implemented by, are embodied within, or are otherwise accessible to, computer 104, such as by implementing any of the elements in computer hardware and/or in computer software embodied in a non-transitory, computer-readable medium in accordance with conventional techniques.

Reference is now made to FIG. 2, which is a simplified flowchart illustration of an exemplary method of operation of the system of FIG. 1, operative in accordance with an embodiment of the invention. In the method of FIG. 2 an interaction is performed with an interface exposed by a computer software application during its execution (step 200). The computer software application detects the interaction (step 202), and, in response, detects an interaction by the computer software application with a persistent data store (step 204). Steps 200-204 are performed for any, and preferably every, interface exposed by the computer software application. Associations are recorded between different interfaces of the computer software application where an interaction with one of the interfaces resulted in data being written to a location within the persistent data store and an interaction with another one of the interfaces resulted in data being read from the same location within the persistent data store (step 206). Test data having a characteristic of a malicious payload is provided to the computer software application via any of the interfaces indicated by any, and preferably all, of the associations (step 208). If the test data are written to the persistent data store at the location indicated by the association (step 210), a stored security vulnerability is detected and reported together with any of the information indicated by the association being tested (step 212).

Referring now to FIG. 3, block diagram 300 illustrates an exemplary hardware implementation of a computing system in accordance with which one or more components/methodologies of the invention (e.g., components/methodologies described in the context of FIGS. 1-2) may be implemented, according to an embodiment of the invention.

As shown, the techniques for controlling access to at least one resource may be implemented in accordance with a processor 310, a memory 312, I/O devices 314, and a network interface 316, coupled via a computer bus 318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer.

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A computer-implemented method using a black-box tester for identifying stored security vulnerabilities in a computer software application having first and second interfaces therein, comprising:

detecting, responsive to a first interaction between the tester and the first interface during execution of the computer software application, a first interaction at a location within a persistent data store in which first data is written to the location;

detecting, responsive to a second interaction between the tester and the first interface during execution of the computer software application, a second interaction at the location within the persistent data store in which second data is read from the location;

recording an association between the first interface and the second interface; providing, to the computer software application and via any interface indicated by the association, test data having a characteristic of a malicious payload; and identifying, based upon the test data being written to the persistent data store at the location, a stored security vulnerability associated with the computer software application, wherein the recorded association includes an identity of the first and second interfaces and the location, and a plurality of interfaces within the computer software application are tested to identify a plurality of associations.

2. The method of claim 1, wherein
the black-box tester includes an interface tester configured to interact with the interfaces exposed by the computer software application.

3. The method of claim 1, wherein
the computer software application is configured to detect the first and second interactions with the persistent data store.

4. The method of claim 1, wherein
the malicious payload is a script code configured to be implemented by the computer software application.

5. The method of claim 1, wherein
every interface associated with the plurality of associations is provided with the malicious payload.

6. The method of claim 1, wherein
the identified stored security vulnerability is reported.

7. The method of claim 1, wherein
the computer software application is a web application.

8. The method of claim 1, wherein
the first interface is configured to receive data into the computer software application, and
the second interface is configured to output data from the computer software application.

* * * * *